United States Patent [19]

Wendt

[11] Patent Number: 5,772,159
[45] Date of Patent: Jun. 30, 1998

[54] CONDUIT END FITTING

[75] Inventor: Robert O. Wendt, Adrian, Mich.

[73] Assignee: FKI Industries, Inc., Fairfeld, Conn.

[21] Appl. No.: 705,648

[22] Filed: Aug. 30, 1996

[51] Int. Cl.$^6$ ........................................................ F16L 5/00
[52] U.S. Cl. ............................................. 248/56; 248/27.1
[58] Field of Search ..................... 248/56, 27.1; 403/261, 403/257, 256, 254

[56] References Cited

U.S. PATENT DOCUMENTS

| | | |
|---|---|---|
| 2,025,848 | 12/1935 | Collis . |
| 3,076,668 | 2/1963 | Famely ................................. 248/56 X |
| 3,091,795 | 6/1963 | Budwig . |
| 3,115,225 | 12/1963 | Fraylick et al. . |
| 3,146,010 | 8/1964 | Dellith ............................... 248/27.1 X |
| 3,285,551 | 11/1966 | Tschanz ................................... 248/56 |
| 3,753,582 | 8/1973 | Graham . |
| 4,000,875 | 1/1977 | Jemison et al. ........................... 248/56 |
| 4,234,218 | 11/1980 | Rogers ................................. 248/56 X |
| 4,304,148 | 12/1981 | Hamman .............................. 248/56 X |
| 4,392,836 | 7/1983 | Sugawara . |
| 4,494,719 | 1/1985 | Guidicelli ............................. 248/27.1 |
| 4,657,212 | 4/1987 | Gilmore et al. ......................... 248/56 |
| 4,773,279 | 9/1988 | Spease et al. ........................ 248/56 X |
| 4,901,395 | 2/1990 | Semrau ............................... 248/56 X |
| 5,116,242 | 5/1992 | Scotti . |
| 5,127,764 | 7/1992 | Baer . |
| 5,171,164 | 12/1992 | O'Neil . |
| 5,322,254 | 6/1994 | Birkmaier ........................... 248/27.1 X |

Primary Examiner—Peter M. Cuomo
Assistant Examiner—Rodney B. White
Attorney, Agent, or Firm—Barnes, Kisselle, Raisch, Choate, Whittemore & Hulbert, P.C.

[57] ABSTRACT

A conduit fitting for passage of a conduit through an opening in a mounting wall that includes a tubular body having an internal through-passage for receiving a conduit, an external axially oriented wall surface, and an external circumferential channel axially spaced from the external wall surface. A clip ring is received in the body channel, and has a radially outwardly oriented surface that axially tapers narrowingly away from the wall surface of the tubular body. A circumferential rib extends radially inwardly from the body of the clip ring to engage a bottom surface of the channel at the narrow end of the ring. When the body and ring are inserted through the mounting wall opening, the wide end of the ring is cammed radially inwardly about the rib into the channel on the tubular body, and then expands radially outwardly to capture the mounting wall between the ring and the axially oriented wall surface on the body. A plurality of rings may be provided in differing colors coded to axial thicknesses to accommodate differing mounting wall thicknesses while employing a single tubular body construction.

15 Claims, 2 Drawing Sheets

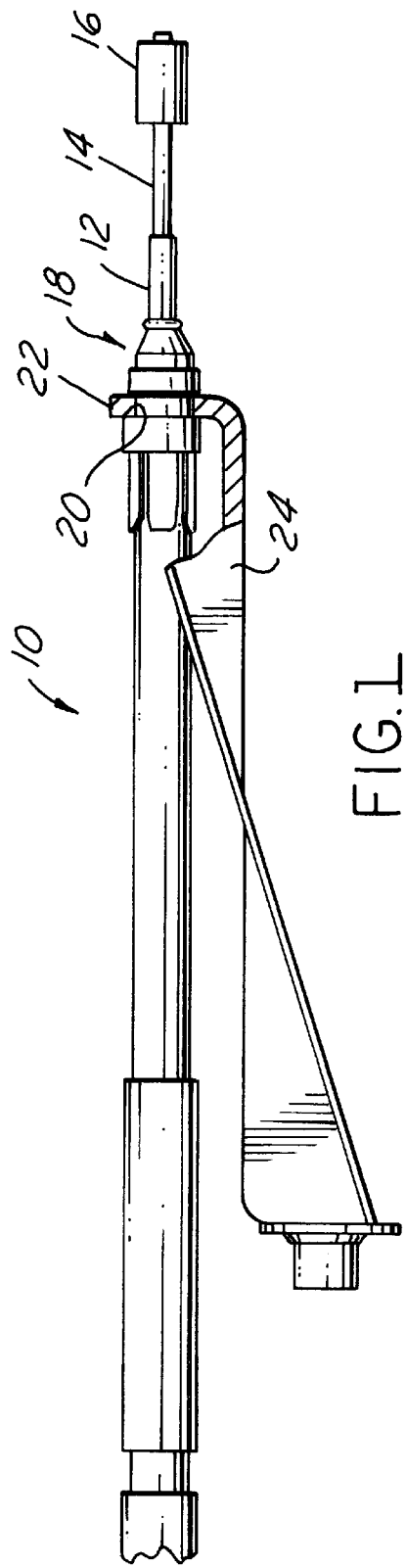
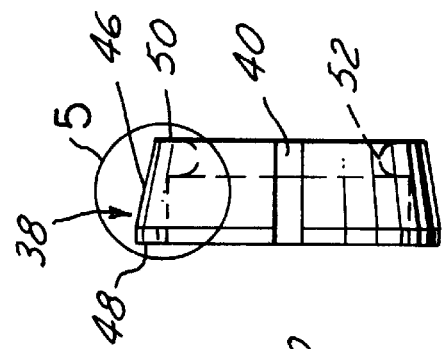
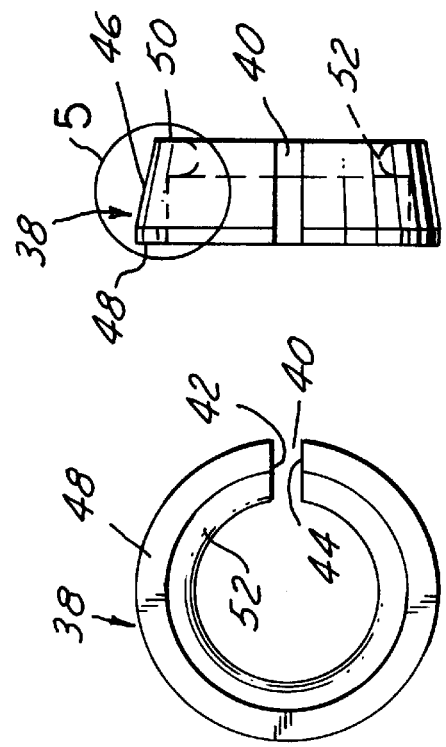
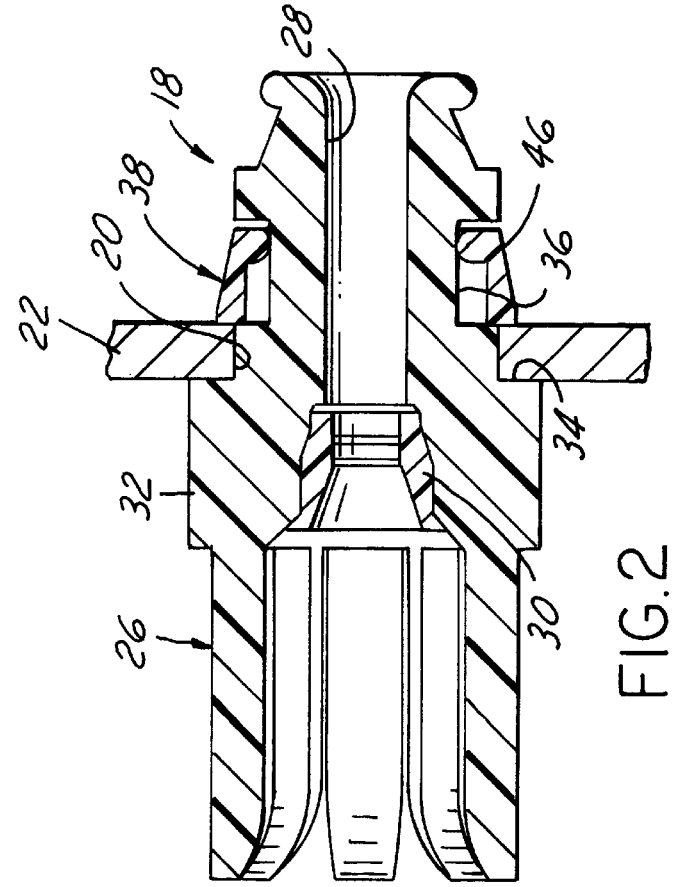

CONDUIT END FITTING

The present invention is directed to fitting arrangements for mounting conduits for passage through mounting walls in brackets or bulkheads, and more particularly to a conduit end fitting for accommodating mounting walls of differing thicknesses.

BACKGROUND AND SUMMARY OF THE INVENTION

There are many applications in which it is required to mount a conduit for passage through a mounting wall opening in a bracket or bulkhead. For example, conduits that slidably mount cables must pass through and be mounted to a number of wall openings in brackets or bulkheads in automotive applications, such as in transmission cables and parking brake cables. The conduit fittings are typically designed and manufactured for mounting on walls of a specific thickness, requiring differing tooling and differing parts for walls of differing thicknesses. This conventional approach undesirably adds to manufacturing and inventory cost.

It is therefore a general object of the present invention to provide a conduit fitting for applications of the type described that is characterized by reduced manufacturing and inventory cost. Another and related object of the present invention is to provide a conduit fitting that may be readily and rapidly assembled through and to a mounting wall opening. A further and yet more specific object of the present invention is to provide a conduit fitting arrangement that accommodates mounting walls of differing thicknesses.

A conduit fitting for passage of a conduit through an opening in a mounting wall in accordance with the present invention includes a tubular body having an internal through-passage for receiving a conduit, an external axially oriented wall surface, and an external circumferential channel axially spaced from the external wall surface. A clip ring is received in the body channel, and has a radially outwardly oriented surface that axially tapers narrowingly away from the wall surface of the tubular body. In accordance with one aspect of the present invention, a circumferential rib extends radially inwardly from the body of the clip ring to engage a bottom surface of the channel at the narrow end of the ring. When the body and ring are inserted through the mounting wall opening, the wide end of the ring is cammed radially inwardly about the rib into the channel on the tubular body, and then expands radially outwardly to capture the mounting wall between the ring and the axially oriented wall surface on the body.

In accordance with a second aspect of the present invention, which may be implemented either separate from or more preferably in combination with the first aspect of the invention, the clip rings are provided in differing thicknesses for accommodating mounting walls of differing thicknesses while employing only a single tubular body construction. In the preferred implementation of this aspect of the invention, the clip rings are color coded in correspondence with associated wall thicknesses. In this way, a single tubular body construction is adapted for use in conjunction with a plurality of differing mounting wall thicknesses by employing correspondingly differing clip rings. Thus, manufacturing and inventory costs are reduced. In the preferred embodiment of the invention, the clip ring is circumferentially split to facilitate assembly to the tubular body, and is of resident plastic composition.

BRIEF DESCRIPTION OF THE DRAWINGS

The invention, together with additional objects, features and advantages thereof, will be best understood from the following description, the appended claims and the accompanying drawings in which:

FIG. 1 is a fragmentary partially sectioned elevational view of a conduit end fitting and bracket assembly in accordance with a presently preferred embodiment of the invention;

FIG. 2 is a sectional view on an enlarged scale of the end fitting and mounting wall arrangement in the illustration of FIG. 1;

FIG. 3 is an end elevational view of the clip ring in the embodiment of FIG. 2;

FIG. 4 is a side elevational view of the clip ring in FIGS. 2 and 3;

DETAILED DESCRIPTION OF PREFERRED EMBODIMENTS

Figure 5:
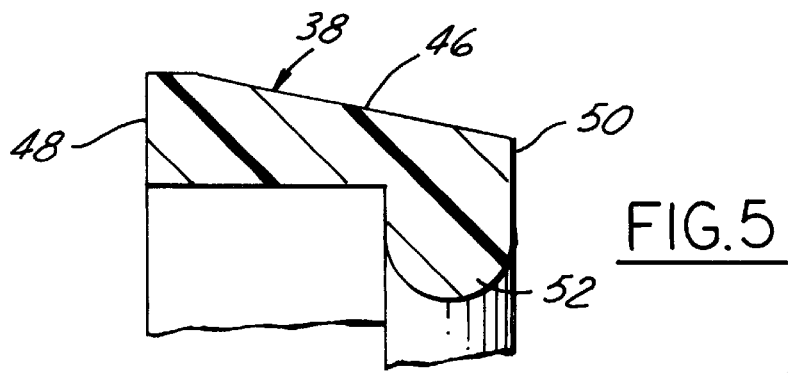
FIG. 5 is a fragmentary sectional view on an enlarged scale of the portion of the clip ring within the circle, 5 in FIG. 4.

FIG. 1 illustrates a conduit end fitting assembly 10 as comprising a conduit 12 within which a cable 14 is axially slidable. Cable 14 terminates in a button 16 for assembly with a desired structure, such as a parking brake pedal. Conduit 12 is mounted within a fitting 18 for mounting to and passage through an opening 20 in a mounting wall 22. In the particular illustration of FIG. 1, mounting wall 22 forms one arm of a mounting bracket 24 contoured for mounting the cable end, conduit and fitting at a desired position within an automobile assembly. The particular construction of conduit 12, cable 14, button 16 and bracket 24 in FIG. 1 are for illustrative purposes only. Mounting wall 22 may also be part of a bulkhead or panel through which the conduit and cable must extend.

Details of end fitting 18 are illustrated in FIGS. 2–5. Fitting 18 comprises a tubular body 26 having a circumferentially continuous wall with an axial through-passage 28 for receiving conduit 12 (FIG. 1). A grommet 30 is positioned within passage 28 for firmly gripping and clamping the outer surface of conduit 12. On the radially outer surface of body 26, there is formed a shoulder 32 having an axially facing radially extending flat annular wall surface 34. A circumferentially continuous channel 36 extends around the outer surface of tubular body 26, and is axially spaced from wall surface 34 by a distance corresponding to the minimum thickness of mounting wall 22. Tubular body 26 may be of rigid metallic composition such as zinc, or more preferably of plastic composition such as nylon.

A clip ring 38 is disposed within channel 36 of tubular body 26. Clip ring 38 is of circumferentially split construction, having a gap 40 between the circumferentially spaced ends 42, 44 in the relaxed or unstressed condition of the ring, as illustrated in FIG. 3. Ring 38 has a radially outwardly facing surface 46 that axially narrowingly tapers from a wide ring end 48 to a narrow ring end 50. A rib 52 extends radially inwardly at narrow end 50 of ring 38 for circumferential sliding engagement with the bottom wall of channel 36, as will be described. Ring 48 is preferably of resilient plastic composition, such as nylon. To assemble ring 38 onto body 26, the ring is circumferentially resiliently enlarged to fit over the narrow end of tubular body 26, and then released into channel 36. The inside radial dimension of rib 52 preferably is coordinated with the radial dimension of the channel bottom such that rib 52 engages and is circumferentially slidable along the channel bottom without stressing the ring radially outwardly, and without substantial radial play between the ring and the channel bottom.

With ring 38 so fitted on tubular body 26, and with a conduit and cable internally fitted into body 26 as illustrated in FIG. 1, the cable and fitting are inserted lengthwise through opening 20 preformed in mounting wall 22—i.e., to the right in FIG. 2. As tapering surface 46 of ring 38 engages the edge of wall mounting opening 20 and is forced therethrough, the opening edge cams ring 38 radially inwardly about a fulcrum formed between the inside radius of rib 52 and the opposing bottom of channel 36. When the mounting wall opening clears ring 38, the ring resiliently returns radially outwardly to its unstressed condition, as illustrated in FIG. 2, so as to capture mounting wall 20 between wall surface 34 of tubular body 26 and wide end 48 of ring 38. Fitting 18 may be removed from mounting wall 22 by radially compressing the wide end of ring 38 using a suitable tool, and then axially pushing the fitting through the mounting opening—i.e., to the left in FIG. 2.

Figure 6:
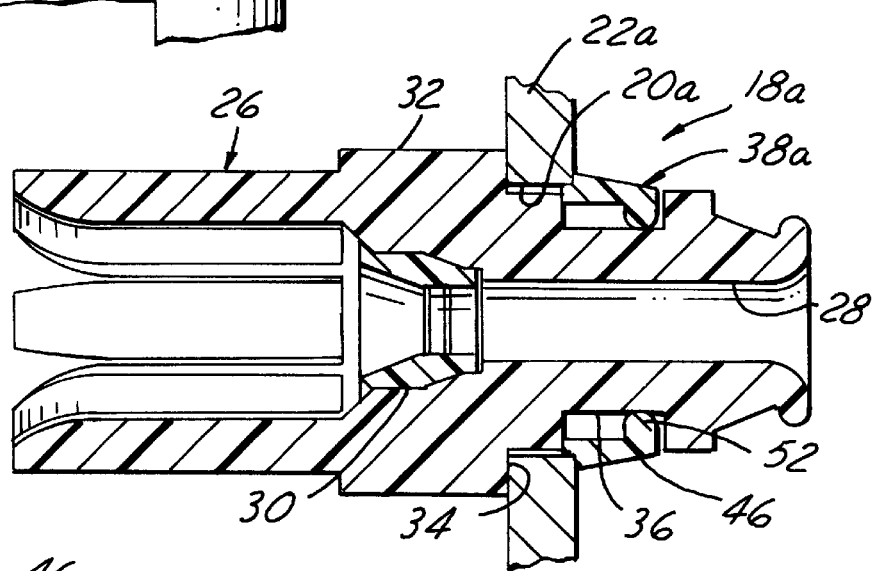
FIG. 6 is a sectional view similar to that of FIG. 2 but showing the end fitting of the invention employed in conjunction with a thicker mounting wall.
Figure 7:
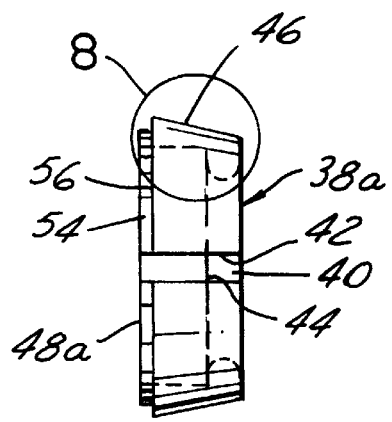
FIG. 7 is a side elevational view similar to that of FIG. 4 but showing the clip ring in the embodiment of FIG. 6.
Figure 8:
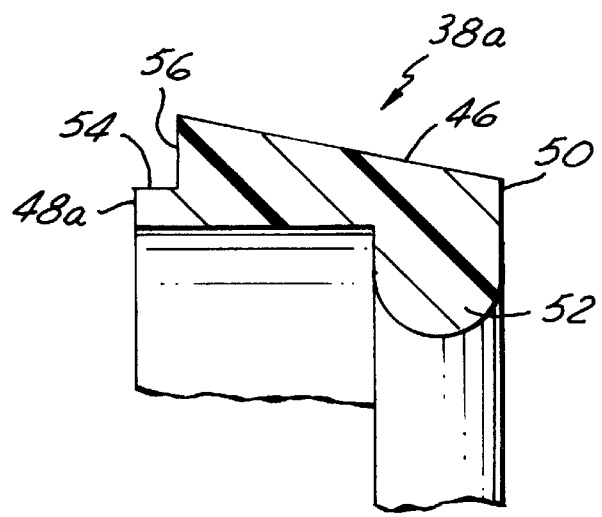
FIG. 8 is a fragmentary sectional view similar to that of FIG. 5 but showing the portion of the clip ring embodiment of FIG. 7 within the circle 8.

FIGS. 6–8, in comparison with FIGS. 2–5, illustrate another feature of the present invention. FIGS. 6–8 illustrate an end fitting 18a in which components identical to those in FIGS. 2–5 are illustrated by correspondingly identical reference numerals, and components similar to those of FIGS. 2–5 are illustrated by identical reference numerals followed by the suffix "a." Specifically, fitting 18a (FIGS. 6–8) is a modification of fitting 18 (FIGS. 2–5) for accommodating a mounting wall 22a of greater thickness than mounting wall 22. A modified clip ring 38a is resiliently mounted within channel 36 of tubular body 26. As compared with clip ring 38 (FIGS. 2–5), clip ring 38a (FIGS. 6–8) has a stepped axially facing radially extending surface at the wide end 48a of the clip ring, the radial dimension of the shoulder 54 formed by this stepped surface is equal to or slightly less than the diameter of mounting opening 20a, and the depth of the step to form the axially oriented surface 56 is coordinated with the axial length of the spacing between the wall surface 34 and channel 36 of tubular body 26 so as to accommodate the thicker mounting wall 22a, as shown in FIG. 6. Thus, a plurality of mounting walls of differing axial thickness may be accommodated by forming correspondingly deeper steps at the wide end of the clip rings. The clip rings of differing effective axial thickness so formed preferably are color coded in the preferred implementation of the invention in coordination with correspondingly differing mounting wall thicknesses. In this way, both the clip rings as piece parts, and the end fittings as assemblies, may be readily identified and associated with different mounting walls by observation of the color of the clip rings.

There has thus been provided a conduit fitting that satisfies all of the objects and aims previously set forth. For example, manufacturing and tooling costs are reduced in that a single tubular body 26 may be employed in conjunction with a plurality of clip rings 38, 38a, etc. for differing mounting wall thicknesses in different applications. Color coding of the clip rings greatly facilitates the manufacturing process. In each application, the fitting may be readily assembled to the corresponding mounting wall, and is firmly held in position by clamping between the wide end of the clip ring and the opposed axially facing wall surface of the fitting body. Furthermore, the fitting may be readily removed from the mounting wall for repair purposes.

I claim:

1. A conduit fitting for passage of a conduit through an opening in a mounting wall, which comprises:

a tubular body having an internal through-passage for receiving a conduit, an external axially oriented wall surface and an external circumferential channel axially spaced from said wall surface, and a circumferentially split clip ring separate from said body circumferentially slidably received in said channel, said clip ring having a radially outwardly oriented surface that axially tapers narrowingly away from said wall surface and means extending radially inwardly slidably to engage a bottom surface to said channel at an end of said ring remote from said wall surface, such that, when said body and ring are inserted axially through the mounting wall opening, said ring cams radially inwardly into said channel about said means extending radially inwardly, and then expands radially outwardly to capture the mounting wall between said ring and said wall surface on said body.

2. The fitting set forth in claim 1 wherein said clip ring is of resilient construction.

3. The fitting set forth in claim 2 wherein both said tubular body and said clip ring are of plastic conjunction.

4. The fitting set forth in claim 2 wherein said clip ring is of resilient plastic composition.

5. The fitting set forth in claim 1 wherein said means extending radially inwardly from said ring comprises a circumferential rib on a radially inwardly oriented surface of said ring.

6. The fitting set forth in claim 1 for mounting on walls of differing thicknesses, comprising a plurality of circumferentially split clip rings of differing axial dimension for capturing walls of correspondingly differing thicknesses between said rings and said wall surface of said body.

7. The fitting set forth in claim 6 wherein at least a first of said rings has a planar axially oriented end surface for axial opposition to said wall surface of said body for capturing between said axially oriented surfaces a mounting wall of a first thickness corresponding to the axial spacing between said wall surface and said channel in said body, and wherein at least a second of said rings has a stepped axially oriented end surface for opposition to said wall surface for capturing a mounting wall of a second thickness greater than said first thickness.

8. The fitting set forth in claim 7 wherein said plurality of clip rings are of differing colors.

9. A conduit fitting for passage of a conduit through an opening in mounting walls of differing thicknesses, which comprises:

a tubular body having an internal through-passage for receiving a conduit, an external axially oriented wall surface and an external circumferential channel axially spaced from said wall surface, and a plurality of clip rings for receipt in said channel, each of said rings having a radially outwardly oriented surface that axially tapers narrowingly from a wide end to a narrow end of said ring, at least a first of said rings having a planar axially oriented end surface for axial opposition to said wall surface of said body for capturing between said axially oriented surfaces a mounting wall of a first thickness corresponding to the axial spacing between said wall surface and said channel in said body, and at least a second of said rings having a stepped axially oriented end surface for opposition to said wall surface for capturing a mounting wall of a second thickness greater than said first thickness.

10. The fitting set forth in claim 9 wherein said clip ring is circumferentially split.

11. The fitting set forth in claim 10 wherein said clip ring is of resilient construction.

12. The fitting set forth in claim 11 wherein each of said rings has means extending radially inwardly at said narrow end of said ring to engage a bottom surface of said channel on said body such that, when said body and a ring are inserted axially through the mounting wall opening, the ring cams radially inwardly into said channel about said means and then expands radially outwardly to capture the mounting wall between the ring and said wall surface on said body.

13. The fitting set forth in claim 12 wherein said means extending radially inwardly from each said ring comprises a circumferential rib on a radially inwardly oriented surface of the ring.

14. The fitting set forth in claim 13 wherein each said clip ring is of resilient plastic composition.

15. The fitting set forth in claim 9 wherein said plurality of clip rings are of differing colors.

\* \* \* \* \*